(12) United States Patent
Eismann et al.

(10) Patent No.: US 9,931,903 B2
(45) Date of Patent: Apr. 3, 2018

(54) CONNECTING ARRANGEMENT FOR A STABILIZER OF A VEHICLE

(71) Applicant: ZF Friedrichshafen AG, Friedrichshafen (DE)

(72) Inventors: Jens Eismann, Melle (DE); Wolfgang Ratermann, Bohmte (DE); Friedhelm Langhorst, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/510,823

(22) PCT Filed: Sep. 15, 2015

(86) PCT No.: PCT/EP2015/070998
§ 371 (c)(1),
(2) Date: Mar. 13, 2017

(87) PCT Pub. No.: WO2016/058765
PCT Pub. Date: Apr. 21, 2016

(65) Prior Publication Data
US 2017/0282673 A1 Oct. 5, 2017

(30) Foreign Application Priority Data
Oct. 17, 2014 (DE) .......................... 10 2014 221 141

(51) Int. Cl.
*B60G 21/055* (2006.01)
*B60G 7/00* (2006.01)
(Continued)

(52) U.S. Cl.
CPC ......... *B60G 21/0551* (2013.01); *B60G 7/001* (2013.01); *B60G 11/183* (2013.01);
(Continued)

(58) Field of Classification Search
CPC ............ B60G 21/0556; B60G 21/0551; B60G 21/0553; B60G 2206/8207; B60G 11/183; B60G 11/20
See application file for complete search history.

(56) References Cited

U.S. PATENT DOCUMENTS 2,169,850 A 8/1939 Rabe
2,588,018 A 3/1952 Lauenstein
(Continued)

FOREIGN PATENT DOCUMENTS

CN 203126446 U 8/2013
DE 1 455 649 12/1968
(Continued)

OTHER PUBLICATIONS

German Search Report Corresponding to 10 2014 221 141.7 dated Jun. 16, 2015.
(Continued)

*Primary Examiner* — James A English
(74) *Attorney, Agent, or Firm* — Davis & Bujold PLLC; Michael J. Bujold

(57) ABSTRACT

A connecting arrangement for a stabilizer of a vehicle, with at least one lever that extends transversely to a longitudinal direction. The lever has a bearing eye provided with a non-circular inner circumferential contour. A torsion-bar spring with a rotation axis extends in the longitudinal direction. The torsion-bar spring has an outer circumferential contour, at least at one end, that matches the inner circumferential contour of the bearing eye and which fits into the bearing eye. The wall of the bearing eye is cut through by at least one slit extending in the longitudinal direction, by which two opposite wall sections of the wall are separated from one another. The two wall sections are pressed against the non-circular outer circumferential con-
(Continued)

tour of the torsion-bar spring by at least one releasable clamping element.

16 Claims, 2 Drawing Sheets

(51) Int. Cl.
*B60G 11/20* (2006.01)
*B60G 11/18* (2006.01)

(52) U.S. Cl.
CPC ........ *B60G 11/20* (2013.01); *B60G 2202/134* (2013.01); *B60G 2204/1224* (2013.01); *B60G 2204/1226* (2013.01); *B60G 2204/43* (2013.01); *B60G 2206/11* (2013.01); *B60G 2206/8207* (2013.01)

(56) References Cited

U.S. PATENT DOCUMENTS

| | | | |
|---|---|---|---|
| 3,140,880 A | 7/1964 | Masser | |
| 7,744,103 B2 | 6/2010 | Gercke et al. | |
| 8,424,890 B2 | 4/2013 | Eismann et al. | |
| 8,684,381 B2 | 4/2014 | Buhl et al. | |
| 9,180,749 B2 * | 11/2015 | Baumer | B60G 11/189 |
| 2005/0117816 A1 * | 6/2005 | Saeger | G02B 21/365 |
| | | | 382/305 |
| 2008/0268965 A1 * | 10/2008 | Gercke | B60G 21/051 |
| | | | 464/99 |
| 2010/0207372 A1 | 8/2010 | Phillips et al. | |
| 2011/0254242 A1 * | 10/2011 | Eismann | B60G 21/052 |
| | | | 280/124.106 |
| 2013/0300188 A1 | 11/2013 | Dhont et al. | |

FOREIGN PATENT DOCUMENTS

| | | |
|---|---|---|
| DE | 2 303 206 | 6/1974 |
| DE | 36 36 878 A1 | 5/1987 |
| DE | 43 42 809 A1 | 6/1994 |
| DE | 10 2008 002 524 A1 | 12/2009 |
| DE | 10 2008 049 940 A1 | 4/2010 |
| DE | 10 2011 112 387 A1 | 3/2013 |
| GB | 660 443 | 11/1951 |
| GB | 1 455 115 | 11/1976 |
| JP | H11-20450 A | 1/1999 |
| WO | 2007/059747 A1 | 5/2007 |
| WO | 2012/059597 A1 | 5/2012 |

OTHER PUBLICATIONS

International Search Report Corresponding to PCT/EP2015/070998 dated Nov. 12, 2015.
Written Opinion Corresponding to PCT/EP2015/070998 dated Nov. 12, 2015.

* cited by examiner

CONNECTING ARRANGEMENT FOR A STABILIZER OF A VEHICLE

This application is a National Stage completion of PCT/EP2015/070998 filed Sep. 15, 2015, which claims priority from German patent application serial no. 10 2014 221 1417 filed Oct. 17, 2014.

FIELD OF THE INVENTION

The invention concerns a connecting arrangement for a stabilizer of a vehicle, with a lever that extends transversely to a longitudinal direction and comprises a bearing eye provided with a non-circular inner circumferential contour and a torsion-bar spring whose torsion axis extends in the longitudinal direction, which is provided at least at one end with a non-circular outer circumferential contour that matches the inner circumferential contour of the bearing eye and which is fitted with that contour into the bearing eye.

BACKGROUND OF THE INVENTION

DE 10 2008 049 940 A1 discloses a connecting device for the torque-transmitting connection of a component attached to a hollow shaft, which component has a through-going aperture whose shape corresponds to the external contour of the hollow shaft and which receives one end of the hollow shaft, such that in the area of the connection between the hollow shaft and the attached component the hollow shaft has a press-plug which at least partially forms a press fit with the inner cross-section of the hollow shaft and is designed as a bearing holder for at least one bearing associated with the hollow shaft. The press-plug presses the wall of the tube against the inside surface of the aperture in the attached component, so that there is also a press fit between the outer surface of the hollow shaft and the inside surface of the aperture in the attached component.

In this connection device the hollow shaft is pressed into the attached component and cannot be released therefrom. For example, if a driver's cabin stabilizer is equipped with this connection device, the disadvantage can arise that for maintenance purposes the entire stabilizer has to be dismantled, for example to maintain the cooler. Moreover, to produce this connection device not inconsiderable investments are required for the purchase of machinery, so that the costs entailed for small production runs are relatively high.

SUMMARY OF THE INVENTION

Starting from there, the purpose of the present invention is to develop further a connecting arrangement of the type mentioned to begin with, such that for the purpose of maintaining a stabilizer equipped with the connecting arrangement it is as a rule not necessary to dismantle the entire stabilizer.

This objective is achieved with a connecting arrangement as described below. Preferred further developments of the connecting arrangement are indicated in the description given below.

The connecting arrangement for a stabilizer of a vehicle, in particular for a driver's cabin stabilizer of a vehicle, comprises one, or at least one lever that extends transversely to a longitudinal direction, which lever has a bearing eye provided with a non-circular inner circumferential contour, and a torsion-bar spring whose rotational axis extends in the longitudinal direction, which is provided at least at one end with a non-circular outer circumferential contour that matches the inner circumferential contour of the bearing eye and which is fitted with that contour into the bearing eye, such that the wall of the bearing eye is cut through by at least one slit extending in the longitudinal direction, by virtue of which two wall sections of the wall opposite one another are separated from one another, these sections being pressed against the non-circular outer circumferential contour of the torsion-bar spring by releasable clamping means, or at least one such means.

The division of the wall into two wall sections opposite one another, separated from one another by a slit, makes it possible in a simple manner, by undoing the clamping means, to take the torsion-bar spring out of the bearing eye since thanks to the slit, when the clamping means are undone the wall sections can be moved at least slightly apart. Thus, in the case of a stabilizer equipped with the connecting arrangement the torsion-bar spring and the lever can be separated from one another so that the whole stabilizer does not have to be dismantled for maintenance purposes.

With this connecting arrangement the longitudinal pressure connection usual in the prior art is replaced by a transverse pressure connection in which the pressure forces are applied by the clamping means. Since the non-circular design of the circumferential surfaces enables torque transmission between the torsion-bar spring and the lever, the clamping means can for example be in the form of conventional screw-bolts so that to form the transverse pressure connection no expensive machinery such as presses is needed. Moreover, with the transverse pressure connection a higher holding force coefficient can be produced than with a longitudinal pressure connection (for example, $\mu=0.1$ instead of $\mu=0.06$), so that larger loads can be transmitted and slipping is reduced.

The wall is in particular a wall of the lever that delimits the bearing eye. Preferably, the wall sections each extend from the slit as far as a wall area or position opposite, or diametrically opposite the slit relative to the rotational axis.

The lever preferably extends perpendicularly to the rotational axis. Preferably, the slit cuts through the wall in a direction extending radially with respect to the rotational axis. In particular, the wall sections are pressed by the clamping means against the outer circumferential contour of the torsion-bar spring in a radial direction relative to the rotational axis. This enables the pressure forces to be distributed as uniformly as possible over the circumference of the torsion-bar spring in the area where it is inserted into the bearing eye.

The clamping means can be made in various ways. In particular, the clamping means engage in the wall sections in the area of the slit. Preferably, the wall sections are pressed together and/or toward one another by the clamping means, particularly in the area of the slit. Owing to the pressing together and/or pressing toward one another of the wall sections by the clamping means, the wall sections are in particular pressed against the non-circular outer circumferential contour of the torsion-bar spring.

In one design version the two wall sections are bolted to one another by the clamping means. Preferably, the clamping means include at least one screw-bolt by means of which the two wall sections are bolted to one another and/or pressed together and/or pressed against one another. By virtue of the bolting to one another and/or the pressing together and/or the pressing against one another of the wall sections by means of the clamping means and/or by means of the screw-bolt, the wall sections are in particular pressed against the non-circular outer circumferential contour of the torsion-bar spring. Preferably, the screw-bolt extends transversely to the longitudinal direction. Preferably, the screw-bolt is arranged a distance away from the rotational axis. Advantageously, the screw-bolt passes through the slit. In particular, in the area of the slit the wall sections are bolted to one another and/or pressed together and/or pressed toward one another by the clamping means and/or by means of the screw-bolt. This provides an inexpensive way to form the clamping means. In particular, the clamping means can be released by undoing the screw-bolt. Preferably, the clamping means are formed by the screw-bolt.

According to a further development, the screw-bolt extends through a first one of the wall sections and is screwed into the second wall section. In that case a bolt head of the screw-bolt is supported against and/or rests in contact with a contact surface of the first wall section that faces away from the second wall section. Preferably, the first wall section is provided with at least one through-hole through which the screw-bolt extends. Preferably, the screw-bolt is screwed into a hole provided in the second wall section, the hole being in particular provided with a screw-thread. The thread is preferably an internal thread. The screw-bolt preferably has an external thread.

Into the slit is preferably inserted a seal, which for example consists of plastic. In this way the penetration of dirt and moisture in the area of the transverse pressure connection can be prevented. Preferably, the screw-bolt passes through the seal.

According to a first variant the wall is made integrally in one piece, so that the wall sections merge into one another. Preferably, in this case the wall sections merge into one another in a material-homogeneous way. Preferably, the wall sections merge together in an area or position of the wall opposite, or diametrically opposite the slit in relation to the rotational axis. When the clamping means have been and/or are being released, the wall sections can accordingly move slightly apart from one another. In particular, when the clamping means have been and/or are being released, the wall sections can move relative to one another by spring action. An advantage of this first variant is that when the clamping means have been released, the two wall sections are still connected to one another and cannot be lost.

According to a second variant, the wall is cut through by two, or at least two slits extending in the longitudinal direction, by which the wall sections are separated from one another so that the wall sections form separate components. Preferably, in this case the two wall sections can even be completely separated from one another when the clamping means are loosened or completely released. This is associated with the advantage that the bearing eye can be opened at the side so that the torsion-bar spring can be taken out of the bearing eye sideways. Here, "sideways" is understood to mean a direction transverse to the longitudinal direction and/or the rotational axis. In particular, relative to the rotational axis the slits are opposite or diametrically opposite one another. Preferably, the slits cut through the wall in areas or positions opposite or diametrically opposite one another relative to the rotational axis.

The clamping means engage in the wall sections in particular in the area of the slits. Advantageously, the wall sections are pressed together and/or toward one another by the clamping means, particularly in the area of the slits. Owing to the pressing together and/or pressing toward one another of the wall sections by the clamping means, the wall sections are in particular pressed against the non-circular outer circumferential contour of the torsion-bar spring.

In one design version the two wall sections are bolted to one another by the clamping means. Preferably the clamping means comprise at least two screw-bolts by means of which the two wall sections are bolted to one another and/or pressed together and/or pressed toward one another. By virtue of the bolting to one another and/or the pressing together and/or the pressing toward one another of the wall sections by the clamping means and/or the screw-bolts, the wall sections are pressed in particular against the non-circular outer circumferential contour of the torsion-bar spring. Preferably the screw-bolts extend transversely to the longitudinal direction. In particular, the screw-bolts are positioned a distance away from the rotational axis. For example, relative to the rotational axis, the screw-bolts are opposite or diametrically opposite one another. Preferably, the screw-bolts are parallel to one another. Advantageously, the screw-bolts extend through the slits. In particular, each of the screw-bolts extends through one of the slits. Preferably, in the area of the slits the wall sections are bolted to one another and/or pressed together and/or pressed toward one another by the clamping means and/or by means of the screw-bolts. In particular, the clamping means can be released by loosening the screw-bolts. Preferably, the clamping means are formed by the screw-bolts.

According to a further development, the screw-bolts extend through the first wall section and are screwed into the second wall section. In that case the bolt heads in particular are supported against and/or rest in contact with a contact surface or a respective contact surface of the first wall section facing away from the second wall section. Preferably the first wall section is provided with at least two through-holes through which the screw-bolts extend. Preferably, the screw-bolts are screwed into holes formed in the second wall section and, in particular, provided with threads. The threads are preferably internal threads. The screw-bolts preferably have external threads.

In a design version the slits lie in a plane that extends in the longitudinal direction and in which the rotational axis also preferably lies. Preferably, the slits cut through the wall in each case in a direction radial with respect to the rotational axis. This enables the pressure forces to be distributed as uniformly as possible over the circumference of the torsion-bar spring in the area of its end inserted into the bearing eye.

The non-circular contours are each preferably a polygonal contour, for example a triangular contour. The corners of the polygonal contours are preferably rounded. Moreover, the sides of the polygonal contours can for example be curved. Alternatively, however, the non-circular contours can for example be oval contours in each case.

The torsion-bar spring is preferably compliant in torsion but with high bend rigidity. For example, the torsion-bar spring can consist of solid material. Preferably however, the torsion-bar spring is in the form of a tube. This saves weight. Furthermore, in the area of its end provided with the non-circular outer contour the torsion-bar spring is preferably expanded. Preferably, a plug is inserted into the torsion-bar spring at its end provided with the non-circular outer contour. In particular, the plug acts against the pressure forces exerted by the wall sections on the non-circular outer contour of the torsion-bar spring, so that for example any deformation of the torsion-bar spring by the pressure forces in the area of the bearing eye can be prevented. Advantageously, the plug is in the form of a bearing, part of a bearing or a bearing holder by means of which, for example, the torsion-bar spring is or can be mounted on part of the, or of a vehicle, such as a chassis frame or a driver's cabin. The torsion-bar spring is preferably made of metal, in particular steel or spring steel. Furthermore the lever is preferably made of metal, in particular aluminum or a ferrous material such as steel. Preferably the lever is a casting, for example an aluminum casting or a ferrous material casting.

According to a further development, the connecting arrangement comprises two levers, each lever extending transversely to the longitudinal direction and being provided with a bearing eye with a non-circular inner circumferential contour, whereas the torsion-bar spring is provided at its ends with outer circumferential contours that match the inner circumferential contours of the bearing eyes and is fitted into the bearing eyes in such manner that the torsion-bar spring extends in the longitudinal direction between the levers. In this case the wall of each bearing eye is cut through by at least one slit that extends in the longitudinal direction, by virtue of which two mutually opposite wall sections of the wall are separated from one another, these sections being pressed against the respective or associated non-circular outer circumferential contour of the torsion-bar spring by means of one, or at least one releasable clamping means. The connections between the torsion-bar spring and the levers can in each case be developed further, as described earlier.

In particular the walls are in each case a wall that delimits the respective bearing eye of the lever concerned. The levers are preferably made of metal, particularly aluminum or a ferrous material such as steel. Preferably the levers are castings, for example aluminum castings or ferrous material castings.

Preferably, the connecting arrangement forms a stabilizer or part of a stabilizer for a vehicle or for the vehicle, the stabilizer being in particular a driver's cabin stabilizer.

In a design version the torsion-bar spring is mounted on a first vehicle component, whereas the lever or levers is/are mounted a distance away from the torsion-bar spring on a second vehicle component. Preferably, one of the vehicle components is a driver's cabin whereas the other vehicle component is a vehicle chassis. Thus, the driver's cabin is preferably connected to the chassis by means of the connecting arrangement. In particular, the driver's cabin and the chassis are components of a vehicle, or of the vehicle.

The invention also concerns the use of the connecting arrangement described above for a vehicle having a chassis and a driver's cabin mounted on the chassis, and/or for a driver's cabin stabilizer of such a vehicle. Preferably, the driver's cabin is connected by means of the connecting arrangement and/or the driver's cabin stabilizer to the chassis. In particular the driver's cabin and the chassis are vehicle components of the vehicle, such that the torsion-bar spring is mounted on one of the vehicle components and the lever or levers is/are mounted on the other vehicle component, particularly a distance away from the torsion-bar spring. For example, the torsion-bar spring is mounted on the driver's cabin and the lever or levers is/are mounted a distance away from the torsion-bar spring on the chassis.

BRIEF DESCRIPTION OF THE DRAWINGS

Below, the invention is described with reference to preferred embodiments relating to the drawings, which show.

DETAILED DESCRIPTION OF THE DRAWINGS

Figure 1:
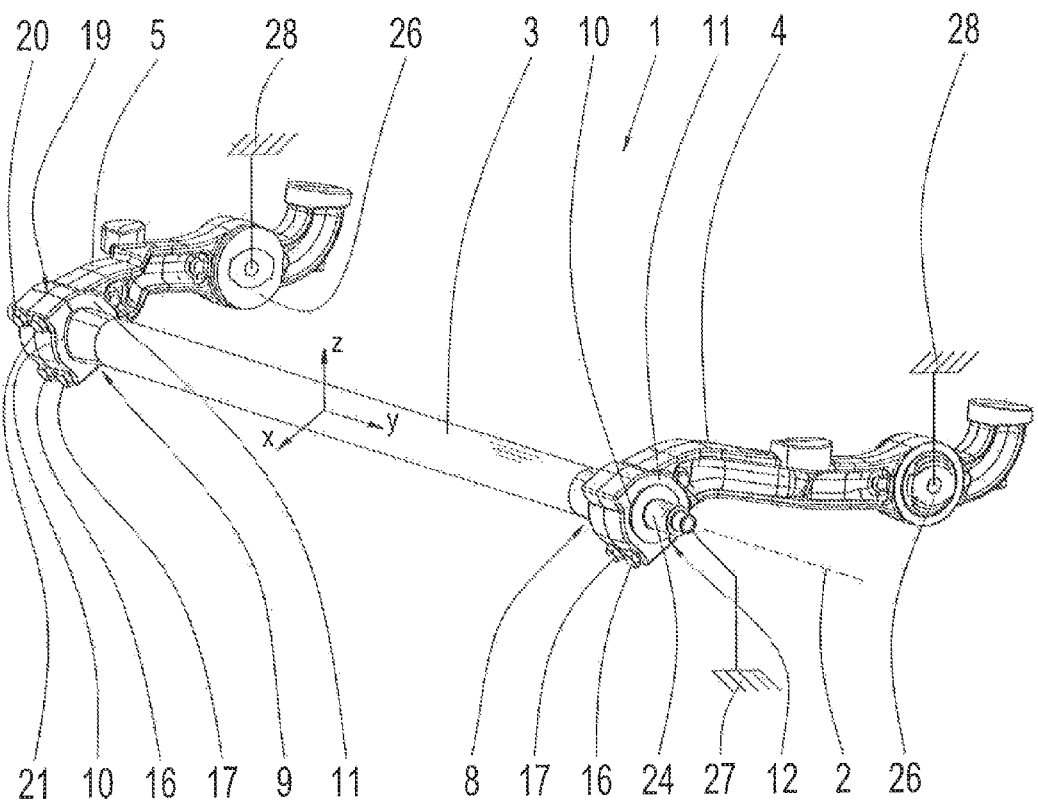
FIG. 1: A perspective view of a driver's cabin stabilizer, in which two different embodiments of the invention are realized.

FIG. 1 shows a perspective view of a driver's cabin stabilizer 1, which comprises a torsion-bar spring 3 that extends with its rotational axis 2 in a longitudinal direction y and two levers 4 and 5 connected thereto, which levers extend transversely to the rotational axis 2 away from the torsion-bar spring 3. To facilitate orientation, in addition to the longitudinal direction y the directions x and z are also shown, such that the directions x, y and z in that order form a system of coordinates. When the stabilizer 1 is fitted into a vehicle, the direction x is preferably a longitudinal direction of the vehicle, the direction y is preferably a transverse direction of the vehicle and the direction z is preferably a vertical direction of the vehicle. Thus, the term "longitudinal direction" for the direction y refers in particular to the direction of the longitudinal extension of the torsion-bar spring 3 of the stabilizer 1.

Figure 2:
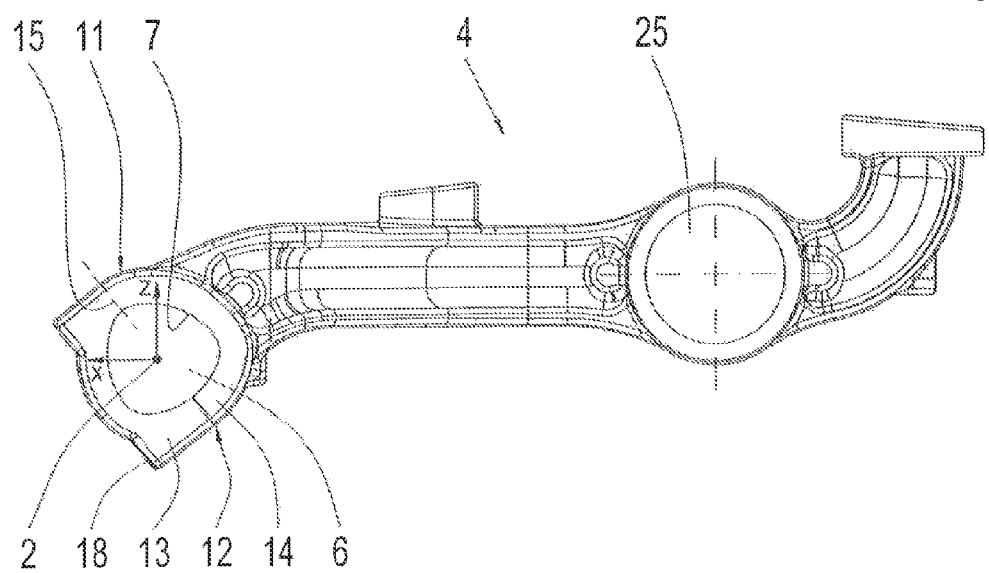
FIG. 2: A side view of a lever of the driver's cabin stabilizer.
Figure 3:
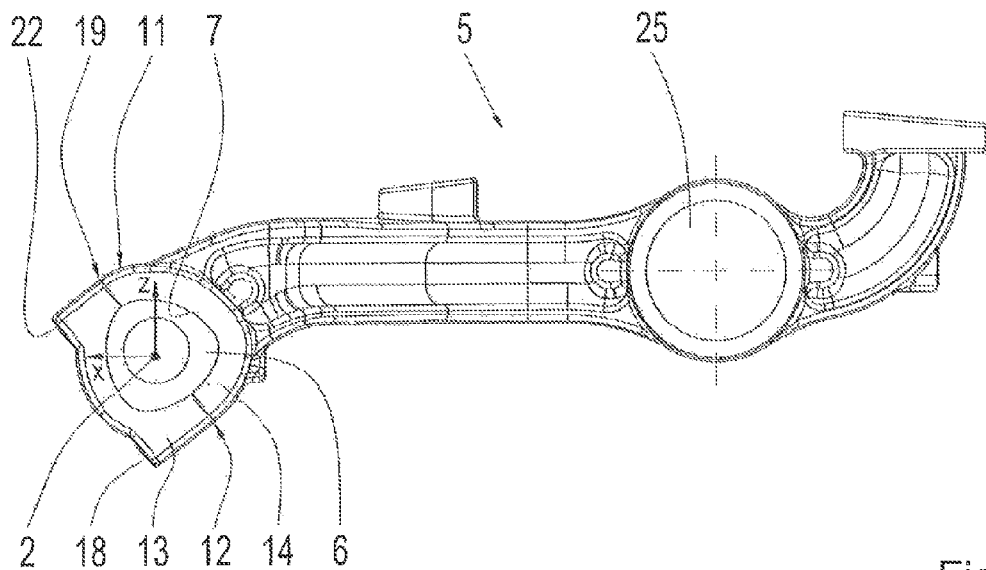
FIG. 3: A side view of another lever of the driver's cabin stabilizer.

The levers 4 and 5 each have a bearing eye 6, which is provided with a non-circular inner circumferential contour 7. This is easiest to see in FIGS. 2 and 3, which show side views of the levers 4 and 5 in detail. The two ends 8 and 9 of the torsion-bar spring 3 are each provided with a non-circular outer circumferential contour 10 that matches the inner circumferential contour 7, so that the torsion-bar spring 3 fits with its end 8 in the bearing eye 6 of the lever 4 and with its end 9 in the bearing eye 6 of the lever 5, in such manner that the torsion-bar spring 3 is connected in a rotationally fixed manner with its end 8 in the lever 4 and with its end 9 in the lever 5. In this case the non-circular contours 7 and 10 are approximately triangular.

The connection of the lever 4 to the torsion-bar spring 3 realizes a first embodiment of a connecting arrangement and the connection of the lever 5 to the torsion-bar spring 3 realizes a second embodiment of a connecting arrangement. Here, in particular, the same indexes are used for identical and/or functionally equivalent and/or similar features in the two embodiments.

The lever 4 has a wall 11 that delimits its bearing eye 6, which wall is cut through by a slit 12 extending in the longitudinal direction y and radially in relation to the rotational axis 2. This slit 12 separates two wall sections 13 and 14 of the wall 11 from one another, the sections merging into one another in an area 15 of the wall 11 located diametrically opposite the slit 12 in relation to the rotational axis 2. Through the wall section 13 and through the slit 12 extend screw-bolts 16 and 17, which are screwed into the wall section 14 and which rest with their bolt heads against a contact surface 18 provided on a side of the wall section 13 facing away from the wall section 14. The screw-bolts 16 and 17 form clamping means by which the two wall sections 13 and 14 are pressed toward one another in the area of the slit 12, so that the wall sections 13 and 14 are pressed against the outer circumferential surface 10 of the end 8 of the torsion-bar spring 3.

The lever 5 also has a wall 11 that delimits its bearing eye 6, which is cut through by a slit 12 extending in the longitudinal direction y and in a radial direction relative to the rotational axis 2. However, the wall 11 of the lever 5 is additionally cut through by a slit 19 extending in the longitudinal direction y and in a radial direction relative to the rotational axis, such that the slits 12 and 19 are diametrically opposite one another relative to the rotational axis 2. The slits 12 and 19 separate two wall sections 13 and 14 of the wall 11 from one another, which in the lever 5 form components separate from one another. Through the wall section 13 and through the slit 12 extend screw-bolts 16 and 17, which are screwed into the wall section 14 and which have their bolt heads 29 resting against a contact surface 18 provided on a side of the wall section 13 facing away from the wall section 14. In addition, screw-bolts 20 and 21 extend through the wall section 13 and the slit 19, which are screwed into the wall section 14 and which have their bolt heads 29 resting against a contact surface 22 provided on the side of the wall section 13 facing away from the wall section 14. The screw-bolts 16, 17, 20 and 21 form clamping means by virtue of which the two wall sections 13 and 14 are pressed toward one another in the area of the slits 12 and 19 so that the wall sections 13 and 14 are pressed against the outer circumferential surface 10 of the end 9 of the torsion-bar spring.

Figure 4:
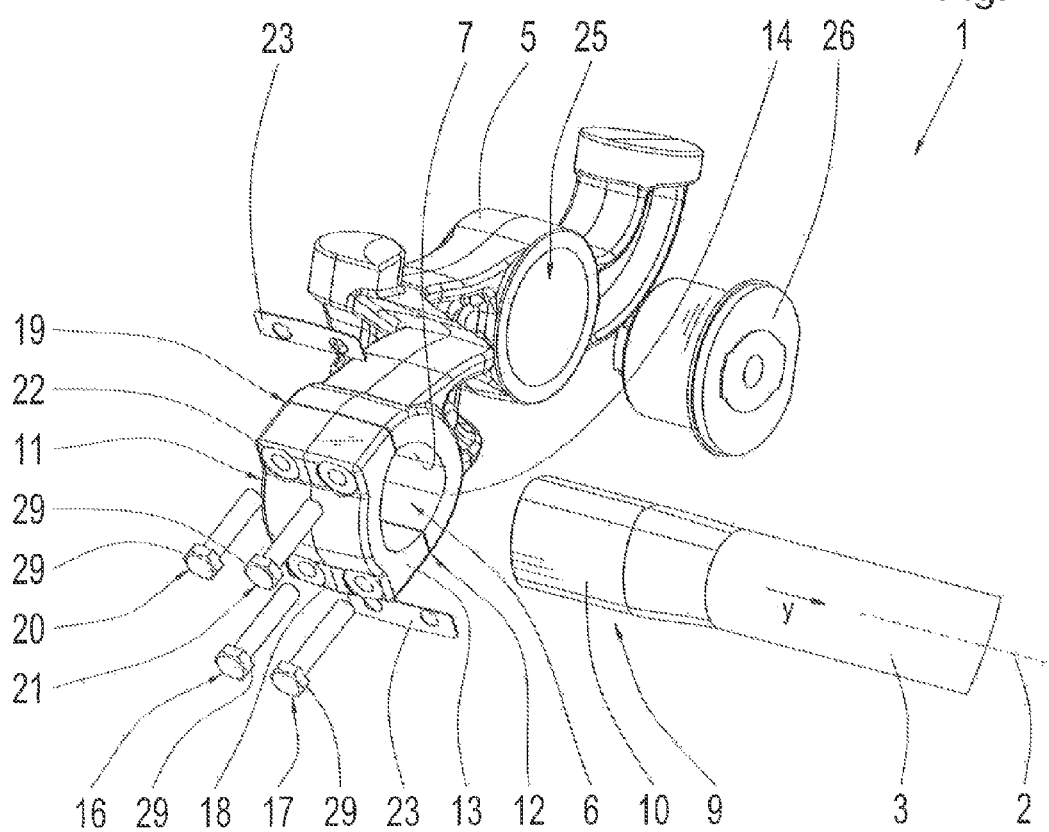
FIG. 4: An exploded representation of part of the driver's cabin stabilizer comprising the other lever.

FIG. 4 shows an exploded view of part of the driver's cabin stabilizer 1 that contains the lever 5, in which seals 23 are shown which in the assembled condition of the stabilizer 1 are inserted into the slits 12 and 19 and through which the respective screw-bolts pass. It can also be seen that in the area of its end 9 the torsion-bar spring 3 is expanded. A corresponding expanded area is provided in the area of the end 8.

From FIG. 1 it can also be seen that a plug 24 is inserted in the end 8 of the torsion-bar spring 3 formed as a tube. This plug serves on the one hand to oppose the pressure forces exerted by the wall sections 13 and 14 on the outer circumferential surface 10 of the end 8 of the torsion-bar spring 3, so that any deformation of the end 8 due to the forces can be avoided. In addition, the plug 24 forms in particular a holder for, or part of a bearing by means of which the torsion-bar spring 3 is mounted on the driver's cabin 27 of a vehicle (the cabin being indicated only schematically). In the end 9 of the torsion-bar spring 3 a corresponding plug is inserted, which also forms a holder for, or part of a bearing by means of which the torsion-bar spring 3 is mounted on the driver's cabin 27. Furthermore the levers 4 and 5 have additional bearing eyes 25 into which bearings 26 are inserted, by means of which the levers 4 and 5 are mounted on a vehicle chassis 28 of the vehicle (this too being indicated only schematically), so that the levers 4 and 5 with their additional bearing eyes 25 and/or with the bearings inserted therein are mounted on the driver's cabin 27.

Although two embodiments are realized in the stabilizer 1 shown, this should not be regarded as limiting. Needless to say, the lever 5 can be provided with only one slit and can be connected to the torsion-bar spring 3 in the same manner as the lever 4. Alternatively, the lever 4 can be provided with two slits and connected to the torsion-bar spring 3 in the same way as the lever 5.

INDEXES

1 Stabilizer
2 Rotational axis
3 Torsion-bar spring
4 Lever
5 Lever
6 Bearing eye
7 Inner circumferential contour of the bearing eye
8 End of the torsion-bar spring
9 End of the torsion-bar spring
10 Outer circumferential contour
11 Wall
12 Slit
13 Wall section
14 Well section
15 Transition zone
16 Screw-bolt
17 Screw-bolt
18 Contact surface
19 Slit
20 Screw-bolt
21 Screw-bolt
22 Contact surface
23 Seal
24 Plug
25 Bearing eye
26 Bearing
27 Driver's cabin
28 Vehicle chassis
29 Bolt head
x Direction
y Longitudinal direction
z Direction

The invention claimed is:

1. A connecting arrangement for a driver's cabin stabilizer of a vehicle, the connecting arrangement comprising:
two levers (4, 5) that extend transversely to a longitudinal direction (y), and each of the two levers comprises a bearing eye (6) being provided with a non-circular inner circumferential contour (7),
a torsion-bar spring (3) with a rotational axis (2) extending in the longitudinal direction (y), the torsion-bar spring having an axially central portion and axially opposite end portions, the end portions of the torsion-bar spring each having a non-circular outer circumferential contour (10) that is expanded relative to the central portion and matches the inner circumferential contour (7) of the bearing eye (6), that is associated with the respective end portion, and fits into the bearing eye (6),
walls (11) of the bearing eyes (6) of the two levers (4, 5), in each case, comprise at least one slit (12) that extends radially outward from the bearing eye and along the longitudinal direction (y), by virtue of the at least one slit, in each case, two wall sections (13, 14) of the walls (11) opposite one another are separated from one another, such that the two wall sections (13, 14) are pressed, in each case, by releasable clamping means against the respective non-circular outer circumferential contour (10) of the torsion-bar spring (3).

2. The connecting arrangement according to claim 1, wherein the at least one slit (12) cuts through the wall (11) in a radial direction relative to the rotational axis (2).

3. The connecting arrangement according to claim 1, wherein the two wall sections (13, 14) are each pressed radially, by the clamping means, relative to the rotational axis (2) against the outer circumferential contour (10) of the torsion-bar spring (3).

4. The connecting arrangement according to claim 1, wherein the clamping means comprise, in each case, at least one screw-bolt (16) that extends transversely to the longitudinal direction (y) and is positioned a distance from the rotational axis (2), and the two wall sections (13, 14) are bolted to one another by the at least one screw-bolt.

5. The connecting arrangement according to claim 4, wherein the at least one screw-bolt (16) extends through a first one (13) of the two wall sections and is received within a threaded hole in a second one of the two wall sections, the at least one screw-bolt being screwed into the threaded hole in the second one of the two wall sections (14) in such manner that a bolt head (29) of the at least one screw-bolt (16) rests against a contact surface (18) of the first one of the two wall sections (13) that faces away from the second one of the two wall sections (14).

6. The connecting arrangement according to claim 4, wherein, in each case, the screw-bolt (16) extends through a seal arranged within the at least one slit (12) between the two wall sections.

7. The connecting arrangement according to claim 1, wherein, in each case, the wall (11) is formed integrally as one piece so that the two wall sections (13, 14) merge into one another.

8. The connecting arrangement according to claim 1, wherein the wall (11) is, in each case, divided into the two wall sections by at least two slits (12, 19) that extend in the longitudinal direction (y), such that the two wall sections (13, 14) are completely separable from one another so that the torsion-bar spring is removable from the bearing eye in a direction transverse to the longitudinal direction.

9. The connection arrangement according to claim 8, wherein the clamping means comprises, in each case, at least two screw-bolts (16, 20) that extend transversely to the longitudinal direction (y) and are spaced away from the rotational axis (2), and the two wall sections (13, 14) are screwed together, by the at least two screw-bolts, with the screw-bolts (16, 20) extending through the at least two slits (12, 19).

10. The connecting arrangement according to claim 8, wherein the at least two slits (12, 19), in each case, cut through the wall (11) at locations opposite one another relative to the rotational axis (2).

11. The connecting arrangement according to claim 1, wherein the non-circular inner and outer circumferential contours (7, 10) are, in each case, polygonal contours.

12. The connecting arrangement according to claim 1, wherein the torsion-bar spring (3) is a tube and a plug is received within each of the respective end portions of the torsion-bar spring, the plugs extend in the longitudinal direction from the respective end portions, and each of the plugs forms one of a bearing, a part of a bearing and a bearing support for mounting the torsion-bar spring.

13. The connecting arrangement according to claim 12, wherein the torsion-bar spring is mounted, via the plugs, to the driver's cabin of the vehicle and ends of the two levers that are opposite from the bearing eyes of the two levers are mounted on a vehicle chassis.

14. The connecting arrangement according to claim 1, wherein the torsion-bar spring (3) is mounted on a first vehicle component and the levers (4, 5) are mounted spaced away from the torsion-bar spring (3) on a second vehicle component, and one of the vehicle components being a driver's cabin (27) and the other of the vehicle components being a vehicle chassis (28).

15. A connecting arrangement for a driver's cabin stabilizer of a vehicle, the connecting arrangement comprising:
   two levers that extend transversely to a longitudinal direction, and each of the two levers comprising a bearing eye provided with a non-circular inner circumferential contour,
   a torsion-bar spring defining a rotational axis which extends in the longitudinal direction, a non-circular outer circumferential contour, that matches the inner circumferential contour of the respective bearing eye, being provided at each opposed end of the torsion-bar spring,
   at least one slit, that extends along the longitudinal direction, cuts through walls of the bearing eyes of the each of the two levers to form respective first and second wall sections, by virtue of the at least one slit, the respective first and the second wall sections are separated from one another, and the respective first and the second wall sections are pressed toward one another, against the respective non-circular outer circumferential contour of the torsion-bar spring, by a respective releasable clamping member, in each case of the first and the second wall sections, the releasable clamping member extends completely through only one of the first and the second wall sections and through a seal which is located within the at least one slit between the first and the second wall sections.

16. A connecting arrangement for a driver's cabin stabilizer of a vehicle, the connecting arrangement comprising:
   a torsion-bar spring (3) defining a rotational axis (2) that extends in a longitudinal direction (y), the torsion-bar spring having a first axial end and an opposed second axial end, and each of the first and the second axial ends of the torsion-bar spring having a non-circular outer circumferential contour;
   a first lever being couplable to the first axial end of the torsion-bar spring such that the first lever extends transversely to the rotational axis of the torsion-bar spring, the first lever having a first wall section and a second wall section with two slits which completely separate the first wall section from the second wall section, and the second wall section being releasably connectable to the first wall section by first releasable clamping members such that one of the first and the second wall sections is completely removable from the first lever to facilitate withdrawal of the torsion-bar spring from a bearing eye of the first lever in a direction transverse to the longitudinal direction, and the other of one of the first and the second wall sections being integral with the first lever,
   the first and the second wall sections each forming the bearing eye of the first lever having a non-circular inner circumferential contour that matches the non-circular outer circumferential contour of the first axial end of the torsion-bar spring, the bearing eye of the first lever receiving the first axial end of the torsion-bar spring, and the first and the second wall sections being connected to one another by the first releasable clamping members to secure the first lever to the first axial end of the torsion-bar spring;
   a second lever being couplable to the second axial end of the torsion-bar spring such that the second lever extends transversely to the rotational axis of the torsion-bar spring, the second lever having a third wall section and a fourth wall section with at least one slit separating the third wall section from the fourth wall section, the fourth wall section being connectable to the third wall section by a second releasable clamping member; and
   the third and the fourth wall sections forming a bearing eye of the second lever having a non-circular inner circumferential contour that matches the non-circular outer circumferential contour of the second axial end of the torsion-bar spring, the bearing eye of the second lever receiving the second axial end of the torsion-bar spring, and the third and the fourth wall sections being connected to one another by the second releasable clamping member to secure the second lever to the second axial end of the torsion-bar spring.

* * * * *